Jan. 17, 1967   P. D. COREY   3,299,341
CONTROL ARRANGEMENT
Filed Jan. 9, 1963   6 Sheets-Sheet 1

INVENTOR.
PHILIP D. COREY
BY Isidore Match
HIS ATTORNEY

INVENTOR.
PHILIP D. COREY
BY Isidore Match
HIS ATTORNEY

INVENTOR.
PHILIP D. COREY
BY Isidore Match
HIS ATTORNEY

United States Patent Office 3,299,341
Patented Jan. 17, 1967

3,299,341
CONTROL ARRANGEMENT
Philip D. Corey, Waynesboro, Va., assignor to General
Electric Company, a corporation of New York
Filed Jan. 9, 1963, Ser. No. 250,264
10 Claims. (Cl. 321—47)

This invention relates to voltage control circuits. More particularly, it relates to circuits wherein there is provided controlled unidirectional power from an A.C. power source.

In circuits wherein a unidirectional voltage is provided from an A.C. power source, a common and efficacious arrangement for producing such unidirectional voltage is to utilize a bridge rectifier wherein active devices such as thyratrons, transistors or gate controlled rectifiers may be employed as rectifying elements in several of the legs of the bridge. The use of gate controlled rectifiers in this capacity is particularly advantageous since they are rugged semiconductive devices which have the capability of handling "high" power without suffering any deleterious effects.

It has been found that when bridge rectifiers employing gate controlled rectifiers have been utilized to produce controlled unidirectional power from an A.C. power source and such unidirectional power has been used to control the current in an inductive load such as the field current in voltage regulator circuits for brushless generators, for example, many difficulties have been encountered. Thus, where the bridge rectifier contains gate controlled rectifiers in a plurality of the legs thereof, and where these gate controlled rectifiers are simultaneously gated into conductivity, full unidirectional power is applied to the generator field substantially at the instant that the gate controlled rectifiers are rendered conductive whether or not the gating of the gate controlled rectifiers is phase controlled. Consequently, the generator output voltage, in effect, is substantially steadily maximal. In other words, steady full-wave rectified power is applied to the generator field in any case whether the phase controlled gating of the gate controlled rectifiers calls for minimum to maximum power. The generator output is substantially steadily at peak, i.e., its output voltage "sticks at ceiling."

In the situation wherein the gate controlled rectifiers in the bridge are alternately gated into conductivity, the same loss of control of field excitation occurs. However, in this situation, maximum half wave power is applied to the generator field irrespective of the phasing of the gating of the controlled rectifiers.

The bridge rectifier circuits which utilize gate controlled rectifiers as discussed hereinabove generally include a load such as a generator field connected across the D.C. terminals of the bridge and a rectifier connected in shunt with the load in such polarity whereby it provides a path for load currents during those intervals when none of the gate controlled rectifiers in the bridge are conductive. These load currents are present mainly in situations where the load is of the lagging power factor type, i.e., inductive. Such load shunting rectifier in this type bridge rectifier circuit is the so-called "coasting" rectifier.

It has been found that the forward voltage drop across the coasting rectifier when it is conducting is in such polarity whereby it tends to supply holding current to the gate controlled rectifiers in the bridge. This phenomenon coupled with the existence of appreciable impedance in the A.C. source results in the application of full-wave rectified power to the generator field no matter at what angle the gate controlled rectifiers are gated into conductivity. This effect is aggravated even further if the coasting rectifier exhibits a comparatively high forward voltage drop for a given forward current and if the holding current of the gate controlled rectifiers is low.

Accordingly, it is an important object of this invention to provide a phase controlled A.C. to D.C. bridge rectifier circuit wherein the output unidirectional voltage is controllable whereby there is produced normal control of load voltage under all conditions of load and under transient conditions.

It is a further object of this invention to provide a bridge rectifier circuit in accordance with the preceding object which employs gate controlled rectifiers as the rectifying elements therein and which may be utilized with single phase and polyphase A.C. circuits.

Generally speaking and in accordance with the invention, there is provided in a circuit comprising a plurality of rectifying devices adapted to have applied thereto and to be conductive only during portions of half cycles of output from an alternating current potential source for rectifying such source output and a load to which the rectified output is applied, the circuit including first rectifying means connected in circuit with the load in a polarity such that current is provided to the load when the rectifying devices are not conductive, second rectifying means connected in circuit with the rectifying devices and the first rectifying means in a polarity such that the rectifying devices are prevented from being conductive at times other than during the aforesaid portions.

The novel features, which are believed to be characteristic of this invention, are set forth with particularity in the appended claims. The invention itself, however, both as to its organization and method of operation together with other and further objects thereof may best be understood when taken in connection with the accompanying drawings.

Figure 1:
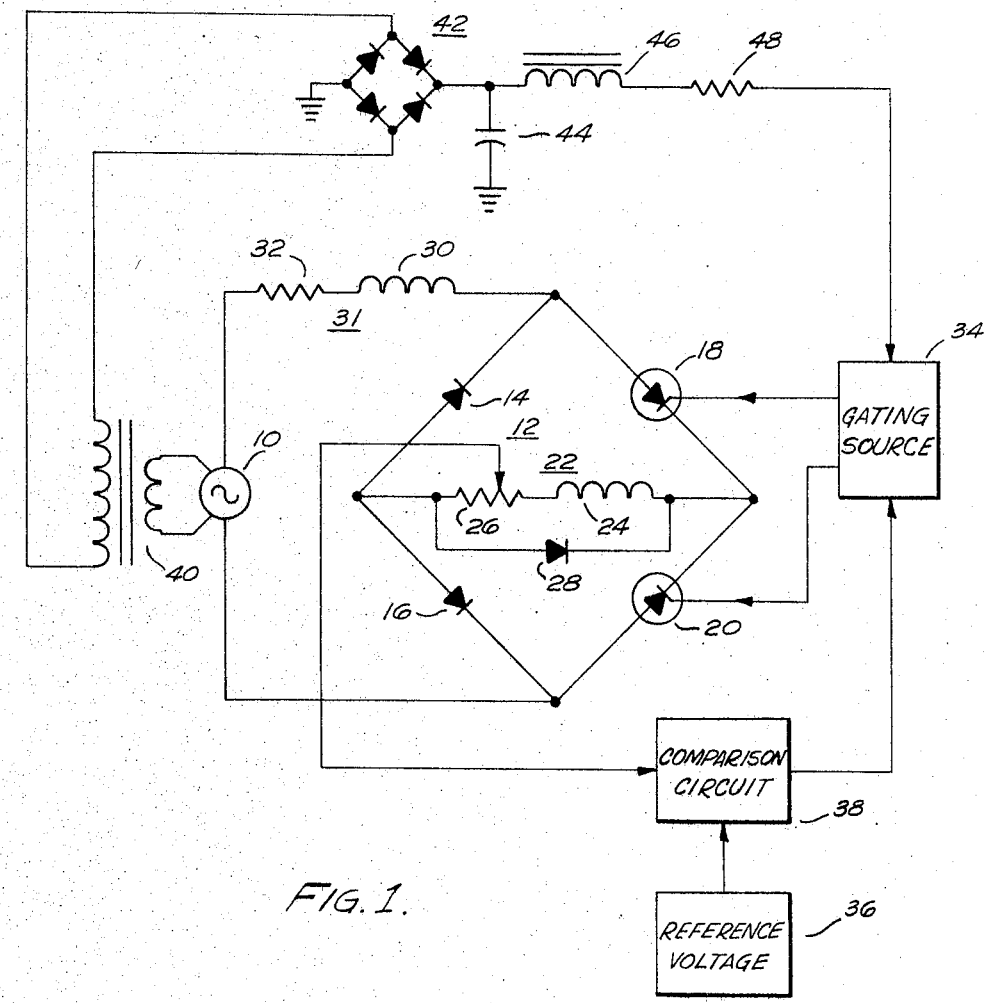
FIG. 1 is a diagram of a known A.C. to D.C. bridge rectifying circuit employing gate controlled rectifiers in two legs of the bridge and having a "coasting" rectifier connected across the load.
Figure 2:
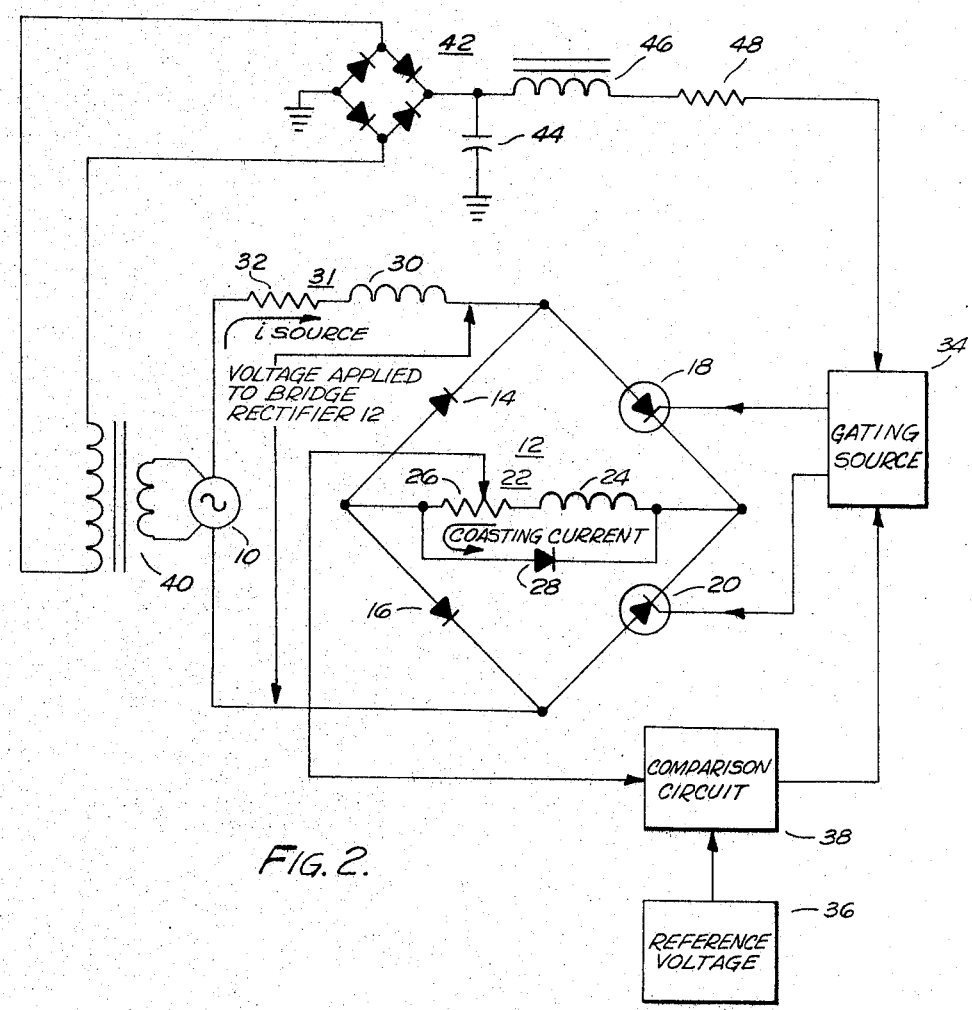
FIG. 2 is a diagram the same as FIG. 1 and shows the current flow paths in the circuit.
Figure 3:
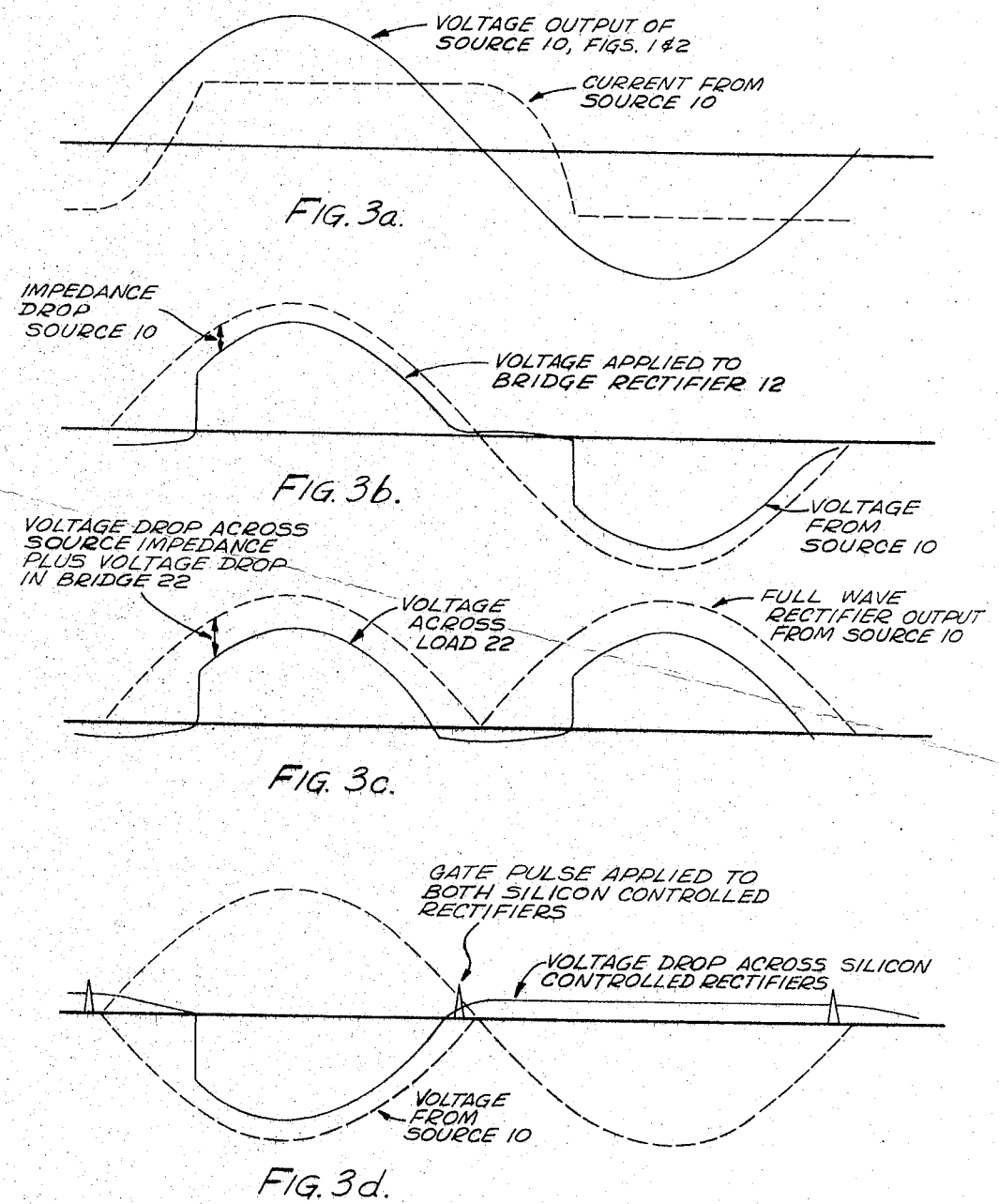
Figure 4:
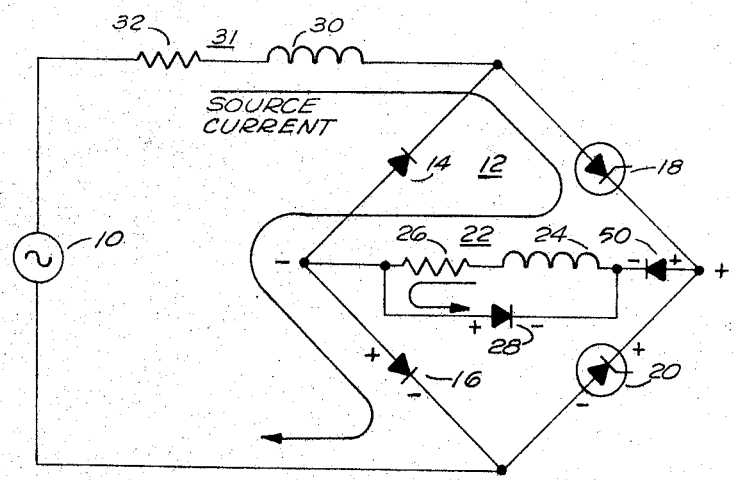
Figure 5:
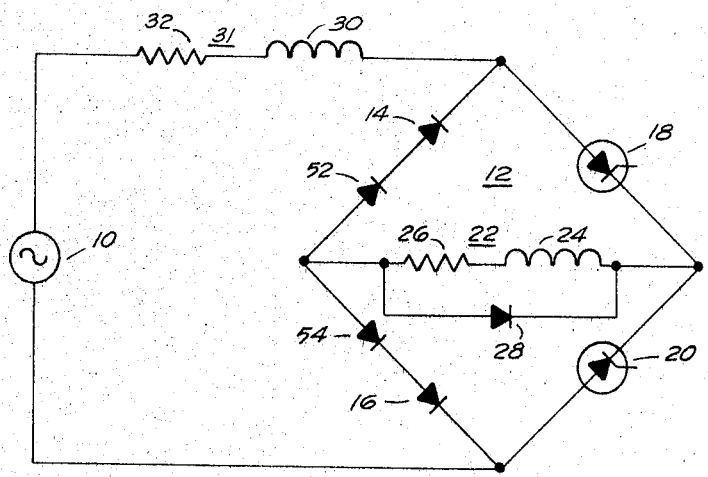
Figure 6:
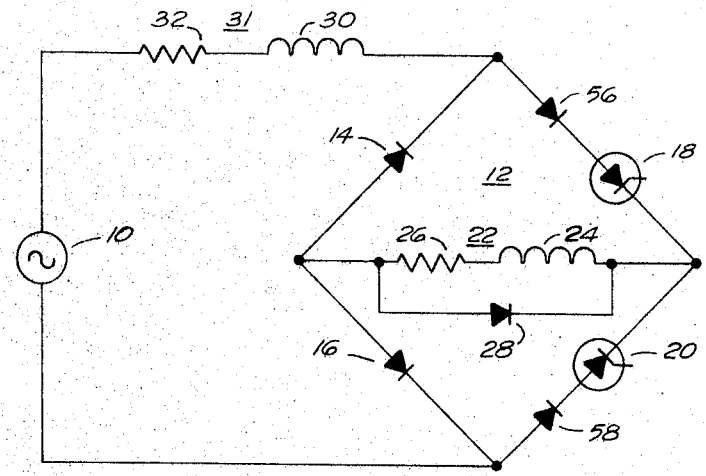
Figure 7:
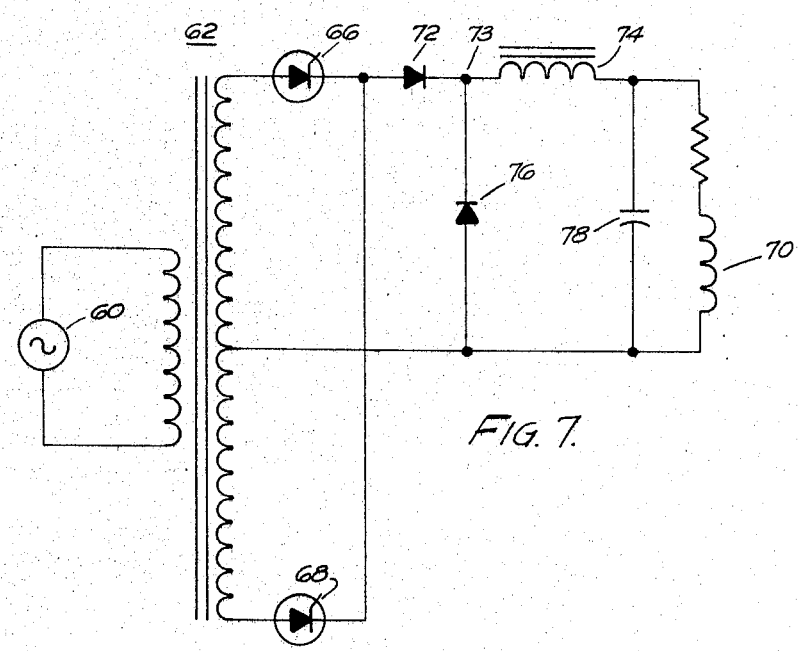
Figure 8:
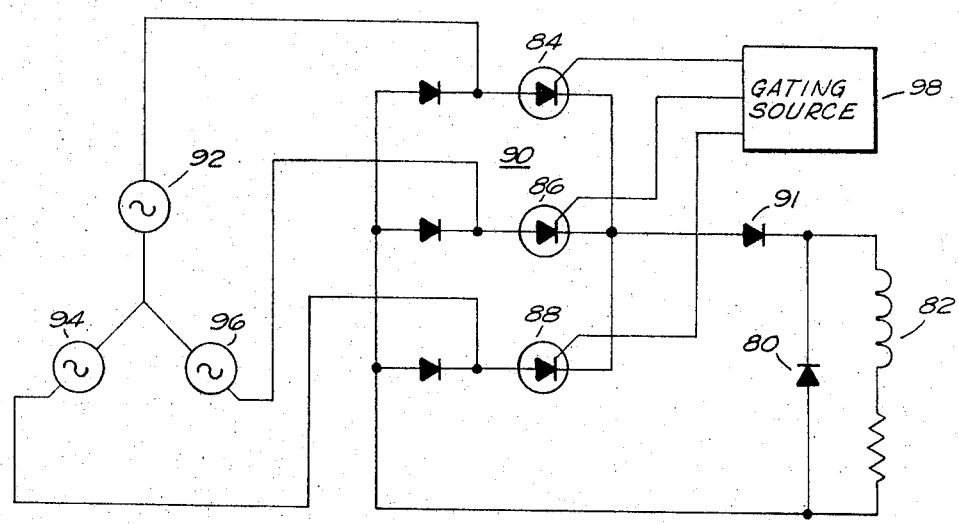

FIGS. 3a, 3b, 3c and 3d comprise a timing diagram of waveforms occuring at different points in the circuit of FIGS. 1 and 2;

FIG. 4 is a diagram of a first embodiment of a bridge rectifying circuit constructed in accordance with the principles of the invention;

FIG. 5 is a diagram of a second embodiment of a bridge rectifying circuit in accordance with the invention;

FIG. 6 is a diagram of a third embodiment of a bridge rectifying circuit in accordance with the invention;

FIG. 7 is a diagram of a center-tapped circuit constructed in accordance with the principles of the invention; and FIG. 8 is a diagram of a polyphase bridge rectifying circuit in accordance with the invention.

Referring now to FIG. 1, there is shown the known A.C. to D.C. bridge rectifier circuit utilizing a pair of gate controlled rectifiers in respective adjacent legs of the bridge and a coasting rectifier to provide a path for load current where the load is inductive and during those times when the gate controlled rectifiers are nonconductive.

In the circuit of FIG. 1, stage 10 depicts the A.C. source whose output power is rectified in the bridge rectifier, generally designated by the numeral 12, the bridge comprising rectifiers 14 and 16 and silicon controlled rectifiers 18 and 20. Bridge 12 supplies unidirectional current to an inductive load 22 depicted as the series combination of an inductance 24 and a resistance 26. A rectifier 28 whose anode to cathode path is connected between the negative and positive D.C. terminals of bridge 12 is the so-called "coasting" rectifier in the circuit and supplies unidirectional current to the load during those intervals that silicon controlled rectifiers 18 and 20 are not conducting. The series arrangement 31 of a resistance 30 and an inductance 32 depicts the internal impedance in A.C. source 10.

Silicon controlled rectifiers 18 and 20 may be either simultaneously gated into conductivity or may be respectively gated at alternate half cycles by the output of a gating source 34 to effect the production of either a full or half-wave rectified output from bridge 12. Gating source 34 when it is utilized to simultaneously gate both of the silicon controlled rectifiers into conductivity may suitably be a unijunction transistor relaxation oscillator such as shown on page 6 of the Silicon Controlled Rectifier Manual, second edition, published by the General Electric Company. If gating source 34 is utilized to fire silicon controlled rectifiers 18 and 20 alternately, then it may suitably be of the type shown on page 59 of the above referred to manual.

To control the phase of the silicon controlled rectifier gating, i.e., that point in the half cycle of output of source 10 in which the gating occurs, the load voltage may be sensed and compared with a reference voltage 36 which represents the desired output voltage in a voltage comparison circuit 38. The output of comparison circuit 38 which represents the difference between the actual output voltage and the desired output voltage is applied to gating source 34 to influence the RC timing arrangements contained therein and thereby provide phase controlled gating of silicon controlled rectifiers 18 and 20 in accordance with the deviation of the output voltage from the desired value.

To provide gating pulses in synchronism with the A.C. voltage from source 10, the known arrangement may be utilized wherein a portion of the voltage from source 10 is provided through a low voltage transformer 40, is full wave rectified in a bridge rectifier 42, passed through a filter comprising a capacitor 44 and an inductor 46, and applied through a resistor 48 to the RC time constant circuits in the unijunction transistor oscillator. The output voltage across load 22 may alternatively be sensed by an arrangement such as shown on page 124 of the above-mentioned manual to control the firing time of the unijunction transistors in gating source 34 and thereby phase control the points of the half cycles from source 10 at which silicon controlled rectifiers 18 and 20 are gated. The circuit shown on page 124 of the above-referred to manual permits phase control across almost the full 180° of a half cycle.

As has been stated hereinabove, in the circuit of FIG. 1, when silicon controlled rectifiers 18 and 20 are gated either simultaneously or alternately by the output from gating source, complete full wave or half wave rectified power results across load 22 no matter what phase of the gating of silicon controlled rectifiers 18 and 20 is called for. In other words, control over the output voltage is lost in the circuit of FIG. 1. Such loss of control is occasioned by the fact that the forward voltage drop across coasting rectifier 28 when it conducts during the intervals that silicon controlled rectifiers 18 and 20 are nonconductive tends to supply holding current to the silicon controlled rectifiers in such a way that this loss of control results. If rectifier 28 exhibits a comparatively high forward voltage drop for a given forward current and if the holding current for silicon controlled rectifiers 18 and 20 is comparatively low, then the effect is aggravated.

FIG. 2 shows current paths and the polarities in the circuit of FIG. 1 when the silicon controlled rectifiers therein are simultaneously gated into conductivity. It is to be noted that silicon controlled rectifiers 18 and 20 can be forward biased at the moment of gating.

FIGS. 3a, 3b, 3c and 3d show the current and voltage waveforms appearing in the circuit of FIGS. 1 and 2. In FIG. 3a, the solid line waveform is the voltage from source 10 and the dashed line waveform is the current from this source. In FIG. 3b the solid line waveform is the waveform of the voltage applied to the A.C. terminals of bridge rectifier 12, the dashed line waveform therein being the voltage from source 10. The difference in voltage between the solid and dashed line waveforms in FIG. 3b is the voltage drop across the impedance of source 10, i.e., the series arrangement of resistor 30 and inductor 32. In FIG. 3c, the solid line waveform is the voltage appearing across load 22 when the silicon controlled rectifiers are gated at the beginning of a half cycle, the dashed line showing what would be the full wave rectified output of source. The voltage difference in these waveforms is the voltage drop across the source impedance plus the voltage drop across bridge 12. In FIG. 3d, the solid line waveform is the voltage across silicon controlled rectifier 20 and the dashed line, the voltage from source 10. The pulses indicate the output of and the times of their occurrences from gating source 34.

It is seen in FIG. 3d that although silicon controlled rectifier 20 is gated into conductivity almost at the end of the negative half cycle of output from source 10, during the positive half cycle of source output, silicon controlled rectifier 20 remains conductive therethroughout. It so remains conductive because the forward voltage drop across coasting rectifier 28 and the impedance of source 10 supplies sufficient holding current to maintain silicon controlled rectifier 20 conductive. The same phenomenon occurs in the case of silicon controlled rectifier 18 and consequently substantially complete full wave rectified power is applied to load 22, no matter when the silicon controlled rectifiers are gated.

In FIG. 4, which is a circuit constructed in accordance with the principles of the invention, the gating source for the silicon controlled rectifiers and the output voltage sensing arrangement have been omitted to enable greater simplicity in the description and explanation of the operation thereof. The gating and output voltage sensing arrangement for FIG. 4 and, in fact, for the circuits of FIGS. 5–6 may all be the same as the circuit of FIGS. 1 and 2. In the circuits of FIGS. 4–6, those structures which are the same as corresponding structures in the circuit of FIGS. 1 and 2 have been designated with the same numerals.

In the circuit of FIG. 4, a decoupling rectifier 50 is inserted in series with load 22 in the polarity shown. Rectifier 50 functions to isolate load 22 and coasting rectifier 28 from bridge 12. Consequently, normal control of the load voltage is enabled under all including transient conditions. Since the forward voltage drop of decoupling rectifier 50 subtracts from the voltage appearing across coasting rectifier 28, unwanted holding current is prevented from flowing, i.e., minimized. It is to be appreciated that rectifiers 14, 16 and 50 have to be chosen such that the sum of the forward voltage drop of recoupling rectifier 50 and either of the forward voltage drops of rectifiers 14 and 16 respectively exceeds the forward voltage drop across coasting rectifier 28 when the current through the load is at maximum. In this connection, it is, of course, to be realized that decoupling rectifier 50 may consist of a plurality of serially connected rectifiers to provide the required degree of isolation. Decoupling rectifier 50 should preferably have a rating such that it can handle the maximum output from bridge rectifier 12. It is seen in the circuit of FIG. 4 in contradistinction to the circuits of FIGS. 1 and 2 that the voltage across silicon controlled rectifier 20 at the end of the negative half cycle prevents it from remaining conductive at the next ensuing positive half cycle.

In FIG. 5 there is shown a circuit constructed in accordance with the principles of the invention wherein instead of placing the decoupling rectifier in series with load 22, additional rectifiers 52 and 54 have been included in the legs containing rectifiers 14 and 16 respectively. Rectifiers 52 and 54 serve to attenuate any holding current which might be supplied to silicon controlled rectifiers 18 and 20 respectively when they should be nonconductive, i.e., when coasting rectifier conducts, and consequently output voltage control is maintained with the circuit of FIG. 5. An important advantage of the circuit of FIG. 5 is that rectifiers 14, 52, 16 and 54 can all be rated at the same current but need only have one half of the peak reverse voltage rating, for example, of rectifiers 14 and 16 in the circuits of FIGS. 1 to 4.

FIG. 6 is a circuit constructed in accordance with the principles of the invention wherein the decoupling rectifying function is accomplished by rectifiers 56 and 58 inserted as shown in the legs of bridge 12 which contain silicon controlled rectifiers 18 and 20 respectively.

In FIG. 7, wherein there is shown a center tapped rectifying circuit constructed in accordance with the principles of the invention, the output of an A.C. source 60 is applied to a transformer 62, the terminals of the center-tapped secondary winding thereof being connected to the anodes of silicon controlled rectifiers 66 and 68. The cathodes of silicon controlled rectifiers 66 and 68 are joined and their junction is connected to one end of the load 70 through the series arrangement of the anode to cathode path of the decoupling rectifier 72 and a filter inductor 74. The other end of load 70 is returned to the midpoint of secondary winding 64. The anode to cathode path of the coasting rectifier 76 in the circuit is connected between the midpoint of secondary winding 64 and the junction 73 of the cathode of rectifier 72 and inductor 74. A shunt connected filter capacitor 78 is provided connected across load 70. Silicon controlled rectifiers 66 and 68 may be alternately or simultaneously gated by the output of a gating source such as shown in FIGS. 1 and 2 and the output voltage may be sensed with an arrangement similar to that shown in FIGS. 1 and 2 and referred to in the above mentioned manual.

It is clear that in the circuit of FIG. 7, decoupling rectifier 72 attenuates the holding current supplied to silicon controlled rectifiers 66 and 68 at the times when the silicon controlled rectifiers should be nonconductive.

The circuit of FIG. 8, which is a polyphase bridge rectifying circuit constructed in accordance with the principles of the invention, also shows a coasting rectifier 80 connected across the load 82 in the polarity as shown whereby it supplies current to load 82 when the silicon controlled rectifiers 84 and 86 and 88 in a three way rectifying bridge 90 should be nonconductive. The decoupling rectifier 91 here, as in the circuits of FIGS. 4 through 7, functions to attenuate any holding current supplied to the silicon controlled rectifiers during such nonconductive times. The outputs of a balanced three phase A.C. source, shown schematically as comprising A.C. generators 92, 94 and 96, are applied to the junction of the cathode of the rectifier and the anode of the silicon controlled rectifier comprising each respective leg of bridge 90. Silicon controlled rectifiers 84, 86 and 88 are gated into conductivity by a gating source 98 whose outputs are in synchronism with the outputs of sources 92, 94 and 96 respectively. The gating source 98 may be a circuit such as shown on page 132 of the hereinabove mentioned manual.

While there have been shown particular embodiments of this invention, it will, of course, be understood that it is not wished to be limited thereto since different modifications may be made both in the circuit arrangements and in the instrumentalities employed, and it is contemplated in the appended claims to cover any such modifications as fall within the true spirit and scope of the invention.

What is claimed as new and desired to be secured by Letters Patent of the United States is:

1. In a circuit comprising a plurality of rectifying devices adapted to have applied thereto the output of an alternating current potential source and to be conductive during varying portions of half cycles of said output for rectifying said output, and a load to which said rectified output is applied, said circuit including first rectifying means connected in circuit with said load in a polarity to provide a path for load current flow when said rectifying devices are adapted to be nonconductive; second rectifying means connecting said rectifying devices with said load, said second rectifying means having a forward voltage drop and a polarity with respect to said first rectifying means to prevent said rectifying devices from being rendered conductive by load current flow at times other than during said portions.

2. In a bridge rectifier circuit comprising at least a pair of switching devices in respective legs thereof, said switching devices being adapted to have applied thereto the output of an alternating current potential source and to be conductive during varying portions of half cycles of said output for rectifying said output, and a load to which said rectified output is applied, said circuit including first rectifying means connected in circuit with said load in a polarity to provide current to said load when said rectifying devices are adapted to be nonconductive; second rectifying means in series circuit with said switching devices and said first rectifying means, said second rectifying means having an opposite polarity and a forward voltage drop with respect to the said first rectifying means such that said switching devices are prevented from being conductive at times other than during said portions.

3. In a bridge rectifier circuit comprising at least a pair of gate controlled rectifiers in respective legs thereof, said gate controlled rectifiers being adapted to have applied thereto the output of an alternating current potential source, a load to which the rectified output of said source is applied, oscillating control means coupled to said source for providing a signal indicative of the deviation of the value of the output across said load from a chosen value, means coupled to said gate controlled rectifiers and said source for gating said gate controlled rectifiers during each half cycle from said source and responsive to said signal for gating said gate controlled rectifiers at points in said half cycles in accordance with said deviation, and a first rectifier in shunt with said load and in a polarity to provide current to said load when said gate controlled rectifiers are nonconductive; a second rectifier in series circuit between said gate controlled rectifiers and said first rectifier in a polarity such that the voltage provided by the sum of the voltage drops across the internal impedance of said source and the forward voltage drop across said first rectifier is prevented from causing said gate controlled rectifiers to conduct during their normally nonconductive periods.

4. In a bridge rectifier comprising respective first and second rectifiers in first and second legs thereof and a pair of gate controlled rectifiers in the other respective legs thereof, said gate controlled rectifiers being adapted to have applied thereto, the output voltage of an alternating current potential source, a load to which the rectified output voltage of said source is applied, a means comprising relaxation oscillator coupled to said gate controlled rectifiers and said source for gating said gate controlled rectifiers during each half cycle from said source and responsive to the voltage across said load deviating from a chosen value for gating said gate controlled rectifiers at points in said half cycles in accordance with said deviation, and a third rectifier in shunt with said load and in a polarity to provide current to said load when said gate controlled rectifiers are nonconductive; a fourth rectifier in series arrangement with said first rectifier in said first leg and a fifth rectifier in series arrangement with said second rectifier in said second leg, the sum of the forward voltage drops of said first and fourth rectifiers and the sum of the forward voltage drops of said second and fifth rectifiers each exceeding the forward voltage drop across said third rectifier when the current through said load is a maximum.

5. In a bridge rectifier comprising first and second gate controlled rectifiers in first and second legs thereof, said gate controlled rectifiers being adapted to have applied thereto, the output voltage of an alternating current potential source, a load to which the rectified output voltage of said source is applied, a means comprising relaxation oscillator coupled to said gate controlled rectifiers and said source for gating said gate controlled rectifiers during each half cycle from said source and responsive to the voltage across said load deviating from a chosen value for gating said controlled rectifiers at points in said half cycles in accordance with said deviation, and a first rectifier in shunt with said load and in a polarity to provide current to said load when said gate controlled rectifiers are nonconductive; a second rectifier in series arrangement with said gate controlled rectifier in said first leg and a third rectifier in series arrangement with said second gate controlled rectifier in said second leg, said second and third rectifiers each having a forward drop and a polarity with respect to said first rectifier to prevent said gate controlled rectifiers from being rendered conductive by load current flow during their normally nonconductive periods.

6. In a rectifying circuit comprising first and second gate controlled rectifiers which are adapted to have applied thereto through a center tapped transformer the output voltage of an alternating current potential source, a load to which the rectified output voltage of said source is applied, a relaxation oscillator coupled to said gate controlled rectifiers for gating said gate controlled rectifiers during each half cycle from said source and responsive to the deviation of the value of the voltage across said load from a chosen value for gating said controlled rectifiers at points in said half cycles in accordance with said deviation, and a first rectifier in shunt with said load and in a polarity to provide current to said load when said gate controlled rectifiers are nonconductive; a second rectifier in series circuit with said gate controlled rectifiers and said first rectifier, said second rectifier having a predetermined forward voltage drop and a polarity with respect to said first rectifier for preventing conduction in said gate controlled rectifiers during their normally nonconductive periods.

7. In a bridge circuit for rectifying and combining the output voltages of a polyphase alternating current potential source comprising a plurality of legs, each of said legs including a gate controlled rectifier, a load to which the combined rectified output voltages of said source is applied, a relaxation oscillator coupled to said gate controlled rectifiers for gating each of said respective gate controlled rectifiers during half cycles of a corresponding phase output from said source and responsive to the deviation of the value of the voltage across said load from a chosen value for gating said controlled rectifiers at points in said half cycles in accordance with said deviation, and a first rectifier in shunt with said load and in a polarity to provide current to said load when said gate controlled rectifiers are nonconductive; a second rectifier in series circuit with said gate controlled rectifiers and said first rectifier, said second rectifier having a predetermined forward voltage drop and a polarity with respect to said first rectifier for preventing conduction in said gate controlled rectifiers during their normally nonconductive periods.

8. In combination a source of undulating voltage, an inductive load circuit, a first unidirectional conducting device, a second unidirectional conducting device, means for rectifying said undulating voltage to provide a rectified voltage, means for applying said rectified voltage to said load circuit comprising said second device, means for causing the conduction of said rectifying means only during desired portions of the time period of occurrence of said undulating voltage, means for providing an independent path for said load current flow during the non-conducting periods of said rectifying means comprising said first device, means for preventing said rectifying means from being rendered conductive by the load current flow in said independent path during said non-conducting periods of said rectifying means comprising said second unidirectional conducting device.

9. In combination a source of undulating voltage, an inductive load circuit, a first unidirectional conducting device, a second unidirectional conducting device, means for rectifying said undulating voltage to provide a rectified voltage, means for applying said rectified voltage to said load circuit comprising said second device, means for causing the conduction of said rectifying means only during desired portions of the time period of occurrence of said undulating voltage, means for providing an independent path for load current flow during the non-conducting periods of said rectifying means comprising said first device, means for decoupling said rectifying means from said load circuit during said non-conducting periods of said rectifying means comprising said second unidirectional conducting device.

10. In combination a source of undulating voltage, an inductive load circuit, a first unidirectional conducting device, a second unidirectional conducting device, a pair of gate controlled PNPN junction type semiconductor devices for rectifying said undulating voltage to provide a full wave rectified voltage, means for applying said full wave rectified voltage to said load circuit comprising said second device, means for causing the conduction of said semiconductor devices only during desired portions of the time period of occurence of said undulating voltage, said first rectifying device connected in parallel with said load circuit for providing an independent path for load current flow during the non-conducting periods of said semiconductor devices, said second device being poled to decouple said rectifying semiconductor devices from said load circuit during said non-conducting periods of said rectifying semiconductor devices to prevent said rectifying semiconductor devices from being rendered conductive by the load current flow in said independent path.

References Cited by the Examiner

UNITED STATES PATENTS

| | | |
|---|---|---|
| 3,084,294 | 4/1963 | Vallese. |
| 3,152,296 | 10/1964 | Meszaros. |
| 3,193,728 | 7/1965 | Skirpan. |
| 3,214,667 | 10/1965 | Foster et al. |

FOREIGN PATENTS 875,564   8/1961   Great Britain.

OTHER REFERENCES

General Electric Company, Silicon Controlled Rectifier Manual, 2nd ed., N.Y., 1961, p. 40.

JOHN F. COUCH, *Primary Examiner.*

LLOYD McCOLLUM, *Examiner.*

W. M. SHOOP, M. WACHTELL, *Assistant Examiners.*